United States Patent [19]

Ford

[11] Patent Number: 4,674,685

[45] Date of Patent: Jun. 23, 1987

[54] SPRAYING SYSTEM

[75] Inventor: John W. Ford, Dixon, Calif.

[73] Assignee: Krifor, Inc., Dixon, Calif.

[21] Appl. No.: 689,437

[22] Filed: Jan. 7, 1985

[51] Int. Cl.$^4$ .............................................. B05B 3/18
[52] U.S. Cl. ..................................... 239/160; 239/1;
239/737; 239/744
[58] Field of Search ............... 239/176, 1, 195, 177.2,
239/161, 163, 170, 718–720, 721, 183, 184, 187,
189, 173, 172, 160, 165; 254/134.5; 242/86.5 R

[56] References Cited

U.S. PATENT DOCUMENTS

| | | | |
|---|---|---|---|
| 664,240 | 12/1900 | Dachring | 239/718 |
| 695,504 | 3/1902 | Stewart | 254/134.5 |
| 2,741,509 | 4/1956 | Melcher | 239/718 |
| 2,974,676 | 3/1961 | Hagelthorn | 239/195 X |
| 3,628,731 | 12/1971 | Phillips | 239/189 |
| 4,230,272 | 10/1980 | Snell | 239/176 X |
| 4,343,211 | 8/1982 | Volk | 239/195 X |
| 4,522,338 | 6/1985 | Williams | 239/177.2 |

*Primary Examiner*—Andres Kashnikow
*Assistant Examiner*—Kevin Patrick Weldon
*Attorney, Agent, or Firm*—Thomas M. Freiburger

[57] ABSTRACT

A method for spraying pesticides, herbicides or the like in a moving path from above includes extending a support cable across and over the area to be sprayed and tensioning the cable between two vehicles, one on each side of the area to be sprayed. One or more material spraying nozzles or outlets are supported on the cable and fed by a material-delivering conduit also supported on the cable and connected to a source of material supply on one of the vehicles. The cable is tensioned to a preselected tension sufficient to limit sag in the cable, and tension in maintained substantially constant as the two vehicles are advanced forward with the cable and spray nozzle over the path to be sprayed, irrespective of convergence and divergence of the two vehicles. Constant tension is maintained by a hydraulic motor driving a cable storage reel at constant force. The spray nozzle or nozzles may be brought into position by an electric-powered cable tractor engaged on the tensioned cable and movable along the cable to maneuver the nozzle into position.

10 Claims, 6 Drawing Figures

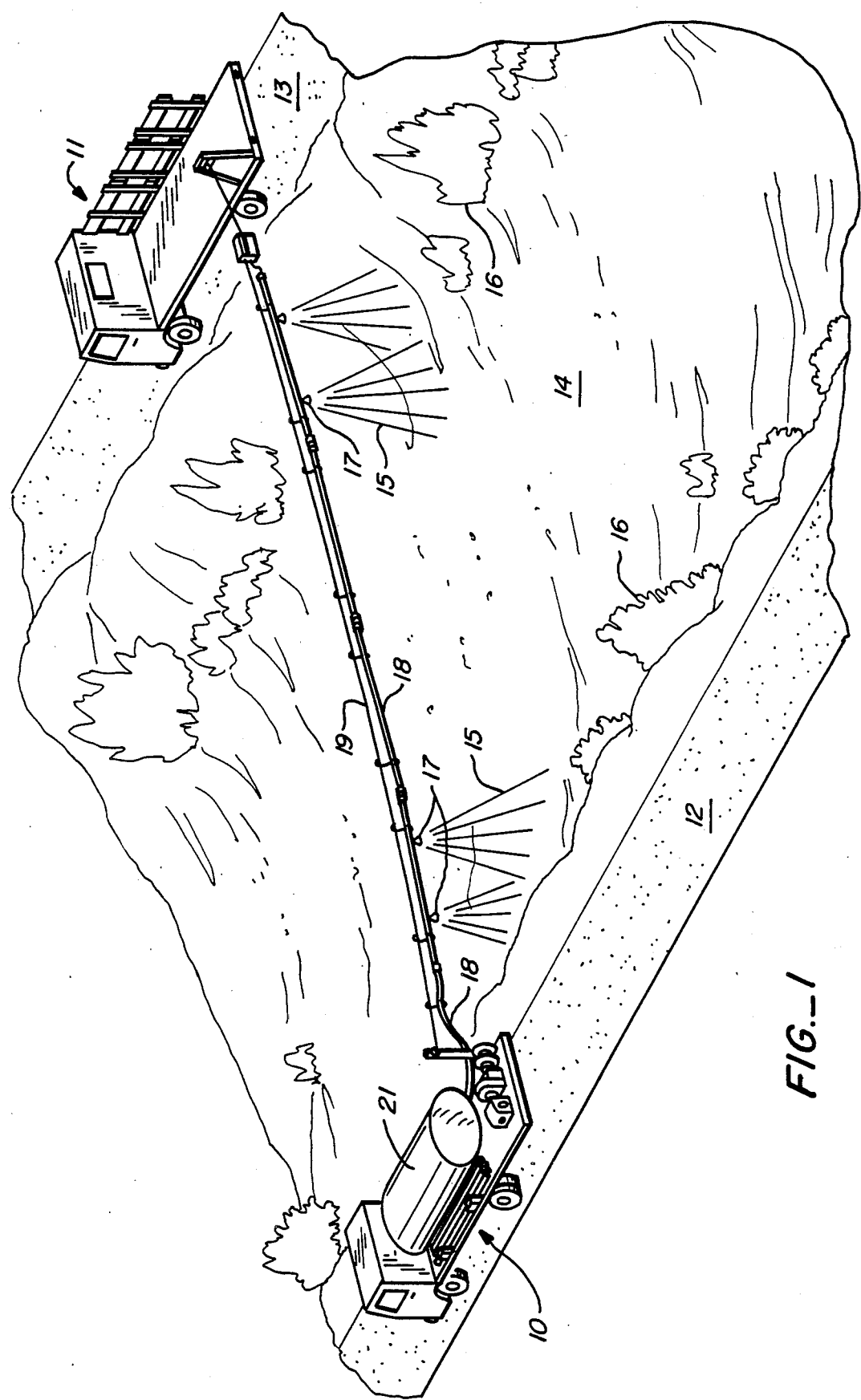
FIG._1

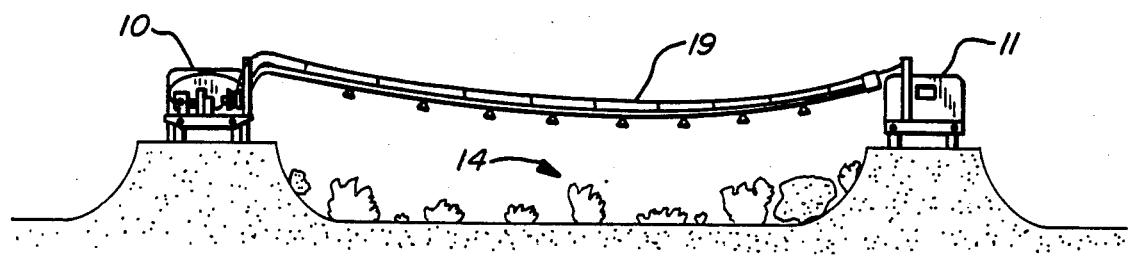
FIG._2
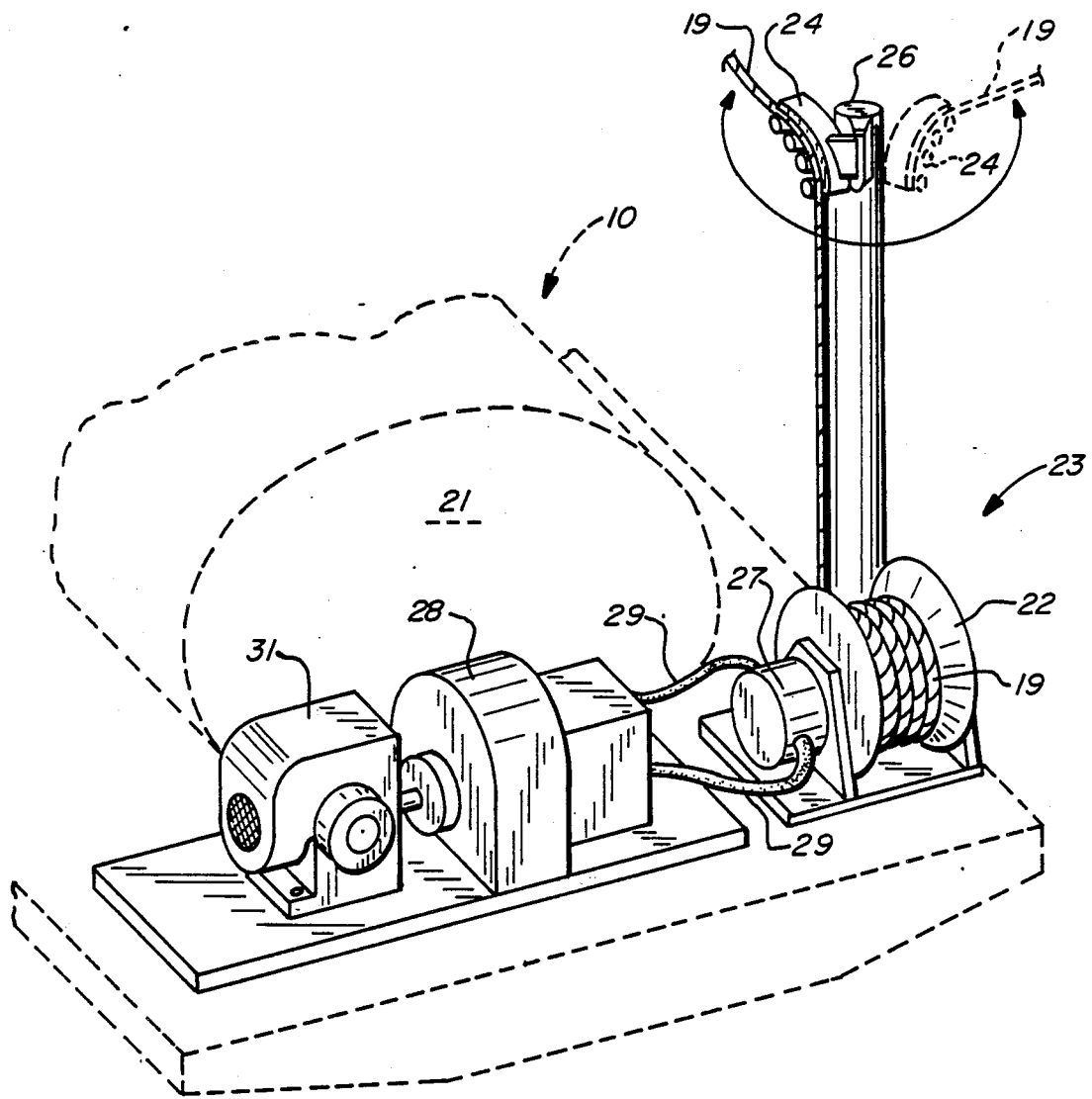
FIG._3

U.S. Patent  Jun. 23, 1987  Sheet 3 of 3  4,674,685
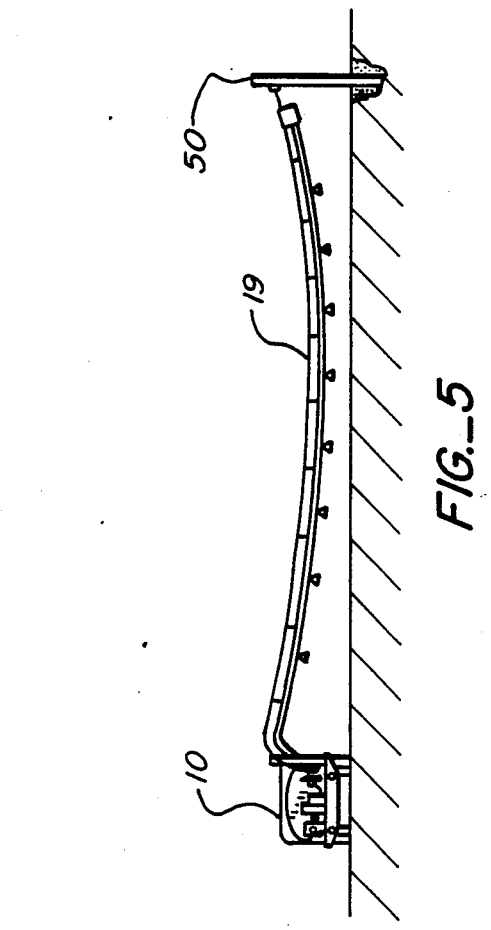
FIG._4.
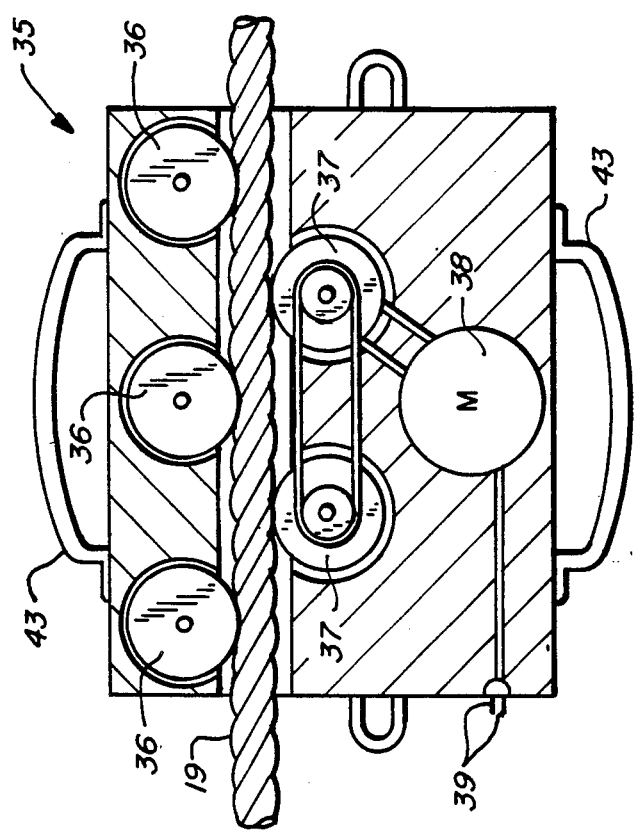
FIG._5
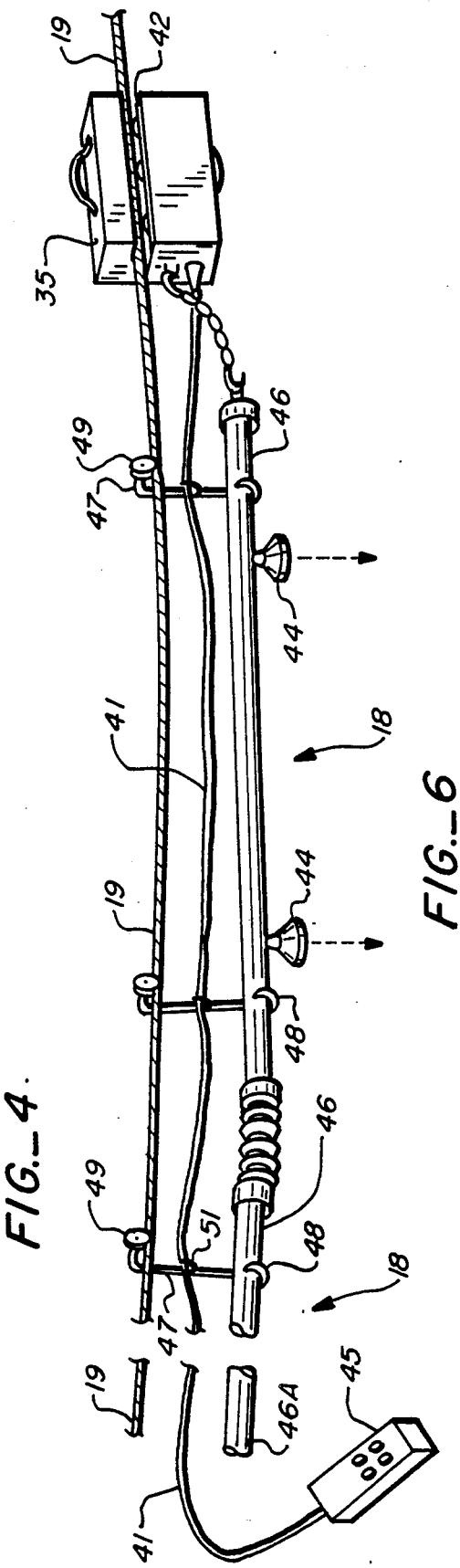
FIG._6

SPRAYING SYSTEM

BACKGROUND OF THE INVENTION

The invention relates to spraying systems, and more particularly to a method for spraying pesticides, herbicides, or the like in a moving path from above.

There is a need in many locations for efficient control of weeds and other vegetation growth. Such growth is often efficiently inhibited by application of chemicals, but in many locations there is no easy access for an herbicide-spraying truck to move alongside the path of the vegetation growth. This is also the case with chemical pesticide, insecticide and fungicide application. Such chemicals are usually in liquid form but may also be in powder or granule form.

Aerial spraying with helicopters and light fixed-wing aircraft has been effective, but is expensive and hazardous and also requires special licensing or approval of the particular pesticide or herbicide for aerial application. One reason for such approval requirements is that when sprayed by aircraft, the materials tend to drift and affect unintended areas. The drift also leaves some areas unsprayed and some double-sprayed. The minimum height that can be flown in is limited, limiting accuracy.

With helicopters, the downdraft from the rotor blades can interfere with spraying and can damage fragile crops. All aerial spraying requires nearly ideal weather conditions.

Various apparatus have been suggested for vehicles for spray application of pesticides or herbicides or similar materials onto application paths alongside the moving vehicle. For example, trucks, sometimes with extendable booms, have been used for applying herbicides along the side of roadways to prevent excessive vegetation growth at the edge of the roadway. The reach of such apparatus is very limited.

Alongside drainage ditches, canals and other waterways there is often a need to control vegetation growth on a regular basis, usually done with chemical herbicides. Generally the waterway is too wide to spray both sides with a vehicle moving along one side, and in many cases even one side cannot be sprayed with the conventional moving vehicle, often because the line of vegetation to be controlled is too far away from an accessible travel path for the vehicle.

Accordingly, there has been a need particularly in the fields of vegetation control and pesticide application for a fast and efficient way of spraying materials from above, without the need for aircraft. Conventional equipment and methods have not provided the effectiveness and efficiency of the present invention described below.

U.S. Pat. No. 4,230,272 (Snell) discloses a form of spraying using a flexible apertured pipe stretched between two spaced-apart vehicles, for spraying the area between the vehicles. In one embodiment the patent shows a cable or wire tensioned between the vehicles and clipped onto a flexible apertured pipe, so that the pipe itself does not hold the supporting tension. The patent also discloses replacing one of the vehicles with a fixed structure at a pivot point, for spraying the area within a circle. However, the Snell patent utilizes a cable or pipe tensioning system which would be inadequate and inappropriate for purposes of the present invention described below.

Other patents having some pertinence to features of the present invention are U.S. Pat. Nos. 628,994, 4,014,516 and 4,386,759.

SUMMARY OF THE INVENTION

According to the present invention, a method for spraying materials from above along a path wherein vegetation or insects or other pests are to be controlled includes extending a support cable across and over the area to be sprayed and then, with the cable attached to two vehicles or to one vehicle and a fixed point, one on each side of the area to be sprayed, tensioning the cable to a preselected tension sufficient to limit sag in the cable to a desired amount. One or more material spraying implements or nozzles are supported on the cable, along with a material-delivering conduit also supported on the cable and connected to the nozzle and to a source of material supply on one of the two vehicles. The two vehicles are advanced forward on either side of the path of the area to be sprayed, while material is deliverd to the conduit and the nozzle, and while tension in the cable is maintained at a preselected tension irrespective of convergence and divergence of the two vehicles as they are advanced. Tension is maintained in the support cable by a hydraulic pump feeding a hydraulic motor that in turn drives a cable storage reel at substantially constant force.

The material-delivering conduit preferably comprises a series of pipe sections joined by flexible quick-disconnect joints, suspended from the tensioned cable by clip-on connectors.

For maneuvering of the material-spraying implements or nozzles into the correct positions over the area to be sprayed, an electric-powered cable tractor may be used. The cable tractor is engaged on the tensioned cable to move along the cable and to pull the nozzles and conduit along until the nozzles are in the desired positions.

The invention also encompasses the cable tensioning and tension-maintaining apparatus and method in itself, with respect to support between two vehicles or a vehicle and a fixed point, the separation of which is variable, as well as the cable tractor device and the material-delivering conduit system. Previously, tensioning of electric utility lines during stringing of the lines has been accomplished with somewhat similar hydraulic equipment. However, the hydraulic motor in that situation was merely employed to achieve the proper line tension, not to accomodate a varying separation between the ends of the tensioned lines as in the present invention. Accordingly, it is among the objects of the invention to provide an improved and highly efficient method of spraying a pesticide, herbicide or other material from above, along a path, without need for aircraft and with the material application focused closely on the intended path. These and other objects, advantages, features and characteristics of the invention will be apparent from the following description of a preferred embodiment, considered along with the accompanying drawings.

DESCRIPTION OF THE DRAWINGS

FIG. 1 is a view in perspective illustrating generally the method of the invention for spraying weed control material or pesticide along two generally parallel paths using two vehicles and a suspended cable.

FIG. 2 is a sectional view in elevation, somewhat schematic, showing the spray method and equipment.

FIG. 3 is a partially schematic perspective view showing equipment for tensioning a support cable and maintaining a preselected tension of the cable between two moving vehicles, even during convergence and divergence of the two vehicles.

FIG. 4 is a sectional elevation showing an electric powered cable tractor for advancing conduit and nozzles along the tensioned cable.

FIG. 5 is an elevational perspective view indicating the use of the cable tractor to move the material spraying nozzles and the delivery conduit into position.

FIG. 6 is a view similar to FIG. 2, but showing the spray method used with one vehicle and a fixed pivot point, for spraying areas within a circle.

DESCRIPTION OF A PREFERRED EMBODIMENT

In the drawings, FIGS. 1 and 2 show two trucks 10 and 11 moving along roads or pathways 12 and 13 on opposite sides of a drainage ditch, canal or other waterway 14, which may be 20 or 30 feet in width, or even several hundred feet in width. On either side of the waterway 14 is a line or path of vegetation 16 that interferes with the efficient operation of the waterway and must be controlled. This is accomplished by chemical herbicides 15 being sprayed onto the unwanted vegetation 16. The spray is via nozzles 17 or other material-delivering implements fed by a tubular conduit 18, all suspended on a tensioned support cable 19 connected to the trucks and suspended between them so as to span across the waterway 14 as illustrated.

The truck 10 is a tank with a tank 21 for supply of chemical to the conduit 18, and includes a reel 22 for storage of the support cable 19 and tensioning of the cable, as explained further below. The truck 11, on the other side of the waterway 14, serves as an anchoring truck.

As can be seen from FIGS. 1 and 2, the spray system of the invention can be used to spray herbicides, pesticides or other chemicals in generally parallel, straight lines on separated paths 16 of vegetation, or in a wide, continuous band across the entire width of the canal or ditch 14. Thus, the system may be used to spray vegetation throughout the canal bed 14 during periods of low water, or to add chemicals uniformly to the water itself. The system can also be used to spray a field of crops, or even to sow seeds.

In the spraying system shown in FIGS. 1 and 2, the separation between the two vehicles 10 and 11 as they progress alongside the area to be sprayed will inevitably vary, with the vehicles converging and diverging at least to some degree, which will affect the suspended cable 19. An important component and subsystem of the invention solves this problem by exerting a substantially constant tension on the cable 19, even if the separation of vehicles varies considerably. This subsystem 23 is shown in FIG. 3. The cable 19 is stored on the winding reel 22 and passes over a swiveling cable fairlead device 24, which is mounted on an upright post 26 and, as illustrated, enables the cable 19 to extend from the truck in any orientation within about a 270° arc. Such a device 24 may be as manufactured by General Cable Corporation.

The cable storage reel 22 exerts a substantially constant tension on the cable 19, so that convergence and divergence of the two trucks 10 and 11 does not significantly affect the cable 19 and a substantially constant degree of sag in the tensioned line 19 is maintained. The cable tensioning and pay-out system 23 includes a hydraulic motor 27 exerting substantially constant force on the cable winding reel 22. Such a hydraulic motor slips at a certain degree of resistance, so that while force is continuously applied to the reel 22, the reel is not rotating when the cable 19 is at the preselected tension and the separation between the vehicles is static. However, when the vehicles converge, the reel takes up some cable while maintaining substantially constant tension, and similarly, when the vehicles diverge somewhat, cable is paid out without any significant effect on cable tension.

The hydraulic motor 27 is driven by a hydraulic pump 28, through conduits 29 as shown. In turn, the pump 28 is driven by a motor 31, which may be an electric motor or an internal combustion engine. The cable tensioning system 23 may include, for example, a hydrostatic transmission pump type AA$_4$V manufactured by Rexroth Industrial Hydraulics Division of Bethlehem, Pennsylvania.

FIG. 4 shows an electric powered cable tractor 35, which may be used in connection with the method and apparatus of the invention. As indicated in the sectional view of FIG. 4, the cable 19 is engaged between pulleys or grooved wheels 36 and 37 of the cable tractor, the lower pulleys 37 of which may be drive pulleys driven by an electric motor 38 incorporated in the cable tractor, with electric contact leads 39 extending out from the exterior of the tractor, for connection to an electric cable 41, as shown in FIG. 5. The cable tractor 35 may have an open slot 42 at one side for insertion of the cable 19 therein. The pulleys 36 or 37 may be spring-loaded so that they retract slightly when the cable 19 is pushed laterally between the pulleys 36 and 37, but then grip the cable 19 with their grooved engagement surfaces, which may be coated with a non-slip material adequate gripping friction with the cable 19.

As indicated in FIGS. 4 and 5, the cable tractor 35 may have top and bottom handles 43 for gripping by an operator placing the cable tractor 35 in service.

The tension cable 19 may be of lightweight Kevlar fibers. Such a cable as small as one-fourth in diameter is capable of supporting 6,000 pounds tension.

FIG. 5 also shows the cable tractor 35 in use pulling the material delivering conduit, generally identified as 18, into position for delivery of the chemical material via nozzles 44 on the conduit. The conduit 18 may comprise a series of relatively rigid pipe or tubing sections 46 as indicated, connected by flexible quick-disconnect joints 47, which may be press-fit into ends of adjacent sections, threaded onto the sections, or connected by other suitable, easily releasable means. The sections may be added one-by-one to the conduit 18 at the supply truck 10. Thus, the cable tractor 35 may be advanced (by controls 45 at the end of the electric line 41 at or near the supply truck 10) by about the length of one pipe section 46, another pipe section may be added, then the cable tractor may be advanced another section length and another section added at the supply truck end, etc.

As shown in FIG. 5, the conduit 18, i.e. the pipe sections 46 and nozzles 44, may be suspended from the tensioned cable 19 by clip-on connectors 47, each of which includes a clip-on hook 48 at it lower end and a cable-riding pulley 49 at its upper end. Each connector 47 may also include a clip or hanger 51 for the electric line 41, as indicated.

When the system of the invention is to be used, the vehicles are brought to the slight of the vegetation or other condition to be treated, with one vehicle on either side of the area to be sprayed. The tension line 19 is first extended across the waterway, canal or other area to be sprayed, from vehicle to vehicle. In cases where there is water or any other condition making it difficult to cross between the two vehicles, this may be accomplished by use of a cross-bow. The loose end of the cable 19 is connected to an arrow or weight and is shot over the obstruction to the vicinity of the anchoring vehicle. The loose end is then connected to the anchoring vehicle and the cable tensioning system 23 is operated to establish the desired tension in the cable. Next, the cable tractor 35 is placed on the tensioned cable, the electric wire lead 41 is secured to the cable tractor, and the clip-on connectors 49 and material-delivering pipe sections 46 are hung on the cable, one by one. The first pipe section 46 is secured to the cable tractor. Pipe sections 46 include simple pipe sections 46a having no nozzles 44, so that only the width of the particular areas to be sprayed will be covered when the system is operable. For example, on either side of a drainage ditch, canal or other waterway there may be a growth of tules, bermuda grass or other unwanted vegetation tending to choke the waterway. The pipe sections 46 with nozzles 44 may be positioned in the conduit 18 so as to adequately spray the generally linear path of such growth on each side of the water, without wasting the weed control material in the water itself. In this way, a precise application is achieved, with significant saving of material as compared to aerial application or other methods of ground application.

The cable tractor 35 can either pull or push the line of pipe sections 46 making up the material-delivering conduit 18. Thus, if the conduit is pulled too far, it may be pushed back to maneuver the nozzles precisely into desired locations, and when the operation is complete, the conduit 18 may be pushed back, section by section, until all of the pipe sections 46 have been dismantled and stored back on the supply truck 10. All this may be accomplished by use of the controls 45 at the supply truck 10.

FIG. 6 shows a variation of the system wherein the anchoring truck 11 has been replaced by a fixed, stationary anchoring post 50, for spraying within a circular area 51. The cable 19 is attached to the post 50, which acts as a pivot point, as the supply truck 10 travels generally in a circular path.

The preferred embodiment described herein is intended to be purely illustrative, and not limiting of the scope of the invention. Other embodiments and variations will be apparent to those skilled in the art and may be made without departing from the essence and scope of the invention as described in the following claims.

I claim:

1. Apparatus for spraying material from above along a path comprising:
   a support cable for extending across and over the area to be sprayed;
   a pair of vehicles, comprising a supply vehicle having a container of spray material and a reel storing the support cable, and an achoring vehicle for positioning on the opposite side of said path from the supply vehicle and including means for connecting one end of the support cable to the anchoring vehicle while the cable extends from the reel;
   a hydraulic pump feeding a hydraulic motor mounted on the supply vehicle, the hydraulic motor being engaged with the reel to exert and maintain a substantially constant reeling-in force on the reel to maintain a preselected substantially constant tension on the cable extending between the vehicle and the anchoring vehicle, the hydraulic motor including means for slipping and permitting the reel to pay out cable and to reel in cable as required in response to variations in the separation between the two vehicles so that the force on the reel exerted by the hydraulic motor is equivalent to an opposing force applied upon the reel by the cable stretched between the two vehicles with a desired amount of sag, such that an increase in force upon the reel resulting from a tensioning of the cable caused by a divergence of the two vehicles will overcome the reeling-in force applied to the reel by the hydraulic motor and thereby resulting in cable being pulled from the reel with the reeling-in force acting as a drag limiting the amount pulled until an equilibrium state between opposing forces is again achieved and the cable possesses the desired amount of sag, and a decrease in cable tension from a convergence of the vehicles results in the constant reeling-in force being temporarily greater than the force applied by the slackened cable and causes the reel to reel in cable until the force of the tensioned cable is equal to the reeling-in force whereby the reel will no longer take up cable and the cable possesses the desired amount of sag;
   a material-delivering conduit including at least one material spraying implement, and means for connecting the conduit to and suspending it from the tensioned cable, generally parallel to the cable, and means for connecting the conduit to the container of spray material for delivering the material through the spraying implements;
   whereby the material may be sprayed along a path while the supply vehicle and the anchoring vehicle are moving forward.

2. The apparatus of claim 1, wherein the material-delivering conduit comprises a series of separable pipe sections joined by flexible quick-disconnect points, suspended from the tensioned cable by clip on connectors, and including some pipe sections with a material-spraying implement and some without, whereby the pipe sections may be added one by one from near the supply vehicle to make up the conduit in such a configuration that the conduit when completed will spray material only over desired portions of the width of the path.

3. The apparatus of claim 1, wherein the supply vehicle further includes a cable fairlead device adjacent to the reel and over which the cable extends after exiting the reel, the fairlead device including means permitting changes in the directional orientation of the supply vehicle as the vehicle moves without adversely affecting the tensioned cable.

4. The apparatus of claim 1 further including an electric-powered cable tractor engaged on the tensioned cable to move along the cable, and means for connecting the tractor to the conduit to maneuver the conduit and material spraying implements into the desired position along the cable.

5. A method for spraying material from above along a path, comprising:
   extending a support cable across and over the area to be sprayed;

with the cable attached to a supply vehicle and an anchor vehicle, one on each side of the area to be sprayed, tensioning the cable to preselected and substantially constant tension sufficient to limit sag in the cable to a preselected amount;

supporting a material-delivering conduit with at least one material-spraying implement on the cable and connecting the conduit to a source of material supply on the supply vehicle;

locating material-spraying implements along the conduit only over portions of the path desired to be sprayed, for selectively delivering the material to desired areas along the width of the path; and, advancing the two vehicles forward on either side of the path of the area to be sprayed while delivering material through the conduit and the material-spraying implements, and while maintaining substantially constant tension in the cable at said preselected tension by storing the cable on a reel on the supply vehicle and maintaining substantially constant winding force on the reel with a hydraulic pump such that the reel is permitted to slip and pay out cable or reel cable in automatically as required in response to variations in the separation between the two vehicles, the force on the reel exerted by the hydraulic motor being equivalent to an opposing force applied upon the reel by the cable stretched between the two vehicles with a desired amount of sag, such that an increase in force upon the reel resulting from a tensioning of the cable caused by a divergence of the two vehicles will overcome the reeling-in force applied to the reel by the hydraulic motor and thereby resulting in cable being pulled from the reel with the reeling-in force acting as a drag limiting the amount pulled until an equilibrium state between opposing forces is again achieved and the cable possesses the desired amount of sag, and a decrease in cable tension from a convergence of the vehicles results in the constant reeling-in force being temporarily greater than the force applied by the slackened cable and causes the reel to reel in cable until the force of the tensioned cable is equal to the reeling-in force whereby the reel will no longer take up cable and the cable possesses the desired amount of sag.

6. The method of claim 5, further including maneuvering the material spraying implements into the correct position over the area to be sprayed using an electric-powered cable tractor engaged on the tensioned cable to move along the cable and connected to the material spraying implements and the material-delivering conduit.

7. The method of claim 5, wherein the material-delivering conduit comprises a series of rigid pipe sections joined by flexible quick-disconnected joints, and wherein some pipe sections have at least one material-spraying implement, and some pipe sections are without any material-spraying implement, and wherein the method further includes adding pipe sections selectively one by one from near the supply vehicle storing the source of material supply, so as to position the material-spraying implements only over the areas desired to be sprayed, in a final assembled conduit.

8. The method of claim 7, further including maneuvering the material-spraying implements using an electric-powered cable tractor engaged on the tensioned cable to move along the cable and connected to the material-spraying implements and the material-delivery conduit, and adding pipe sections serially from near the supply vehicle to the material delivery conduit as it is maneuvered away from the supply vehicle by the cable tractor under control of an operator, and conversely, on dismantling the conduit, removing pipe sections one by one while maneuvering the conduit section by section toward the supply vehicle using the cable tractor.

9. A method for spraying material along the sides of a stream, ditch or path having a portion of which is inaccessible for crossing or positioning a vehicle, and having portions which are not to be sprayed, using the steps set forth in claim 5, and wherein the material-delivery conduit comprises a series of rigid pipe sections joined by flexible quick-disconnect joints, and wherein the pipe sections include sections having at least one material-spraying implement and other sections without material-spraying implements, and the method including adding pipe sections one by one from near the supply vehicle storing the source of material supply to build the material-delivery conduit, and locating pipe sections having spraying implements such that they will be in position to spray the desired areas in the final assembled conduit, the remaining portions of the conduit being without spraying implements.

10. The method of claim 9, further including maneuvering the material-spraying implements using an electric-powered cable tractor connected to the material-spraying implements and the material-delivery conduit and engaged on the tensioned cable to move along the cable to advance the conduit and spraying implements under the control of an operator while the pipe sections are added one by one to the conduit.

* * * * *